United States Patent [19]

Kingsbury

[11] Patent Number: 5,405,557
[45] Date of Patent: Apr. 11, 1995

[54] METHOD OF MAKING A MOULDED PHOTOCHROMIC LENS

[75] Inventor: Jeffrey M. Kingsbury, Cotati, Calif.

[73] Assignee: Sola Group Ltd., Menlo Park, Calif.

[21] Appl. No.: 49,798

[22] Filed: Apr. 21, 1993

[51] Int. Cl.⁶ ............................................. B29D 11/00
[52] U.S. Cl. ..................... 264/1.7; 264/1.8; 264/2.2; 264/245; 264/328.7; 264/328.8
[58] Field of Search ............... 264/1.7, 1.8, 2.2, 245, 264/328.7, 328.8, 250, 255

[56] References Cited

U.S. PATENT DOCUMENTS

| | | | |
|---|---|---|---|
| 2,635,289 | 4/1953 | Owens | 264/1.7 |
| 3,363,039 | 1/1968 | Nagai et al. | 264/245 |
| 3,716,489 | 2/1973 | DeLapp | 264/1.7 |
| 3,822,107 | 7/1974 | Wogerer | 264/245 |
| 4,076,788 | 2/1978 | Ditto . | |
| 4,657,354 | 4/1987 | Kobayashi | 264/1.7 |
| B14,758,448 | 1/1994 | Sandvig et al. . | |
| 4,758,448 | 7/1988 | Sandvig et al. . | |
| 4,919,850 | 4/1990 | Blum et al. | 264/1.7 |
| 5,084,223 | 1/1992 | Morita et al. | 264/1.7 |
| 5,219,497 | 6/1993 | Blum | 264/1.7 |

FOREIGN PATENT DOCUMENTS

| | | | |
|---|---|---|---|
| 735781 | 6/1966 | Canada | 264/245 |
| 0476228 | 3/1992 | European Pat. Off. . | |
| 488627 | 6/1992 | European Pat. Off. | 264/1.8 |
| 3622871 | 2/1987 | Germany . | |
| 4220251 | 1/1993 | Germany . | |
| WO89/02818 | 4/1989 | WIPO . | |

*Primary Examiner*—Mathieu D. Vargot
*Attorney, Agent, or Firm*—Howrey & Simon

[57] ABSTRACT

A lens has two or more layered sections of thermosetting material, and a substantially homogenous formation in which at least one of the layered sections has an active photochromic material present. The article is made by: forming a mould cavity from first and second mould halves; loading the mould cavity with a first thermosetting material; partially curing that material; changing the second mould half to define a subsequent mould cavity in which the partially cured material is present; loading the subsequent mould cavity with a subsequent thermosetting material; and curing the first and subsequent thermosetting materials. At least one of the thermosetting materials is loaded with an active photochromic material.

13 Claims, 3 Drawing Sheets

METHOD OF MAKING A MOULDED PHOTOCHROMIC LENS

FIELD Of THE INVENTION

This invention relates to a method of moulding articles, such as spectacle lenses, and, in particular, to a method of moulding an article which is formed from two or more layered sections but which has a substantially homogenous formation.

BACKGROUND

Over the last 20 to 40 years there has been a significant increase in the usage of polymeric materials in the lives o people. Normally this has been as a replacement for other more traditionally used materials because the polymeric material has attributes which lend it to performing the requirements of the task better. One simple and easy example of this is spectacle lenses, where polymeric materials have significantly eroded glass's previous dominance to the case now where more polymeric lenses exist than glass lenses.

Clearly, in order for the polymeric material to provide a true replacement for the traditional material it has to be capable of operating in the true fashion with all forums of additional materials, such as active materials like photochromic materials. With regard to polymeric materials and photochromic materials this is now technically possible, i.e. photochromic materials that are active in polymeric materials are known, and commercially available. However, the addition of the active material to the basic raw polymeric material can drastically increase the price of the material and therefore the final product. An example of this can be illustrated with the materials used for the production of certain types of spectacle lenses:

| | |
|---|---|
| Cost of basic raw polymer (for example Polycarbonate) | $2.50/lb |
| Cost of photochromic loaded Polymer (for example Polycarbonate) | $40.00/lb |

Now if identical spectacle lenses were made from the respective polymers above clearly approximately the same amounts of polymer would be used. Therefore the spectacle lens made from the photochromic Polycarbonate Polymer is 16 times more expensive to produce than that made from the basic raw polymer. This cost is obviously passed on to the customer.

Now the photochromic material perfectly illustrates the waste of material and increased production costs that can be saved.

With photochromic material in the polymeric material it is active between two different states. A first state or low energy state in which the material is clear, uncoloured and a second state or activated state in which the material is coloured. In order for the material to be activated from the first state to the second state actinic radiation is absorbed. Now with the polymeric materials in which the photochromic material is locked the actinic radiation does not penetrate the lens beyond a depth of above a few millimetres. Consequently only the first few millimetres of the lens will have activated photochromic material, therefore the rest of the photochromic material in the body of the lens is wasted, i.e. not used.

OBJECTS AND SUMMARY

The present invention is concerned with finding a method of manufacturing articles, such as spectacle lenses, which include active materials in a fashion which overcomes the above mentioned problem. In accordance with the present invention a method of moulding an article which is formed from two or more layered sections and has a substantially homogenous formation, which article is made from thermosetting polymeric materials, the method uses a mould having first and second changeable mould halves comprising forming a mould cavity from first and second mould halves;

loading the mould cavity by injection with a charge of a first thermosetting materials;

partially curing the first thermosetting material so that an intermediate article is formed that corresponds in shape to the mould cavity;

changing the second mould half so as to define a subsequent mould cavity in which the partially cured first thermosetting material has a surface which is in contact with a surface of the first mould half;

loading the subsequent mould cavity defined by the changed second mould half and the partially cured first thermosetting material with a subsequent thermosetting material which is compatible with the first thermosetting material and curing the first and subsequent thermosetting materials wherein at least one of the first and subsequent thermosetting materials is loaded with an active photochromic material.

The foregoing reference to changing the second mould half is used in a broad sense and refers to the fact the second mould half can be changed for a new mould half or simply moved in its location.

Further because the first thermosetting material is at least partially cured prior to the injection of the second thermosetting material into the mould cavity, the first thermosetting material is formed into an intermediate shape which will substantially hold its shape.

Therefore articles moulded in accordance with the present invention have a layered sectional structure in which the layers are substantially distinct from one another, i.e. the differences in the compositions of the materials, or their properties, are substantially maintained in localised areas but have a substantially homogeneous formation.

In view of the above it would clearly be expected that an article formed in accordance with the present invention would have a structure that is formed in distinct layered sections where a phase boundary would exist between the layered sections. However, for the sake of clarity it is pointed out that this is not the case. An article made in accordance with the present invention has a structure in which no discernible phase boundary exists between the individual adjacent layered sections of the article. Consequently, an article made in accordance with the present invention has a substantially homogenous formation.

It is believed that some form of very localised intermixing/ between the two materials occurs at the boundary between the first and second materials. In this way a single phase is formed at the boundary and no distinct phase boundary will exist. Therefore, an article formed in accordance with the present invention will have layered sections but a substantially homogenous formation.

Due to the fact that an article made in accordance with the present invention has this substantially homogenous formation there is no, or relatively, no weakness in the article due to its structure. Consequently, the chance that separation will occur at the boundary between the two layers is significantly reduced.

The method in accordance with the present invention can be used in the manufacture of articles of the present invention in which a considerable number of layered sections are involved. It is not restricted to the manufacture of articles of the present invention having only two layers, although this is clearly possible.

Therefore, in a preferred embodiment of the present invention the method of manufacturing an article includes changing the mould half $n-1$ times where n is the number of layered sections in the article.

In one particular usage of the present invention the method of moulding is used to manufacture spectacle lenses with photochromic activity.

The active material that is loaded into one of the first or subsequent polymeric materials can be a material that has a particular function, and could perform for example any one of the following functions:

a photochromic material;

an ultra violet absorbing material;

or a property modifier, for example, hardener, scratch resistance material, of the material.

In one particular arrangement of the present invention the active material is the polymeric material. In this way a polymeric material which has more appropriate properties for a particular function can be applied as, for example, a coating to the article.

Suitable thermosetting materials for use with the present invention include: polymers of diethyleneglycol biallyl carbonates, Tris (Hydroxyethyl) isocyanate Tris (Alkyl carbonate), Alkyl esters, Acrylic esters, Uretane (methacyrlates) Aromatic or Alkydic isocyanates, methyl alkyl and Butyl methacrylates. Biphenyl and alkyl esters, vinyl esters and styrenes.

The method of moulding in accordance with the present invention can be used to provide a main body of an article with thin layered section coatings.

For example, in the spectacle lens industry a number of the suitable optical materials used for the manufacture of the lenses are not generally acceptable with regard to wear resistance. That is to say they tend to scratch and, therefore, became optically unacceptable to the wearer. In some cases this scratching can simply occur on normal cleaning of lenses. Now with the method in accordance with the present invention thin layers of scratch resistant polymers can be formed at the two surfaces of a main optical body.

Further, with the advent of polymeric locked photochromics it is possible to significantly reduce the cost of these lenses, by forming the lens with only a layered section of photochromic which has the remainder of the lens formed from the basic polymer.

It should be noted layers formed in accordance with the present invention can be formed of uniform thickness, clearly this would in particular arrangements apply to the layer formed from the polymeric material loaded with the active photochromic material. Therefore, preferably the article formed in accordance with the method of moulding described herein, is formed so that the layer including the active material is of uniform thickness.

This means that an ophthalmic lens which has varying thickness can be formed so that the colouring effect, observed when exposed to actinic radiation when the lens incorporates photochromics is also uniform and this is a distinct advantage over what is presently available further with photochromic materials the forming of a multi layer article with more than one layer of adjacent photochromic loaded layers can produce some unique effects, where the combination of the layers appears to alter the colour produced on the activation of the photochromic.

In one particular example of the present invention the first and subsequent thermosetting materials are essentially the same, however, at least one of the thermosetting materials is loaded with a suitable active material.

It should be noted that more than one of the thermosetting materials can be loaded with a suitable active material. Preferably, the first thermosetting material is loaded with an active material.

In an alternative arrangement one of the subsequent thermosetting materials is loaded with an active material. In a second alternative both the first and the subsequent thermosetting materials are loaded with an active material. This is useful when you have two active materials where the presence of one or other active materials interferes with the operation of the other active material. By using the method of manufacture of the present invention, the article can be manufactured in a fashion which means that the benefits of both of the active materials can be enjoyed and utilised.

BRIEF DESCRIPTION OF THE DRAWINGS

The invention will now be illustrated, by way of description of an example, with reference to the accompanying drawings, in which.

DETAILED DESCRIPTION

Figure 1:
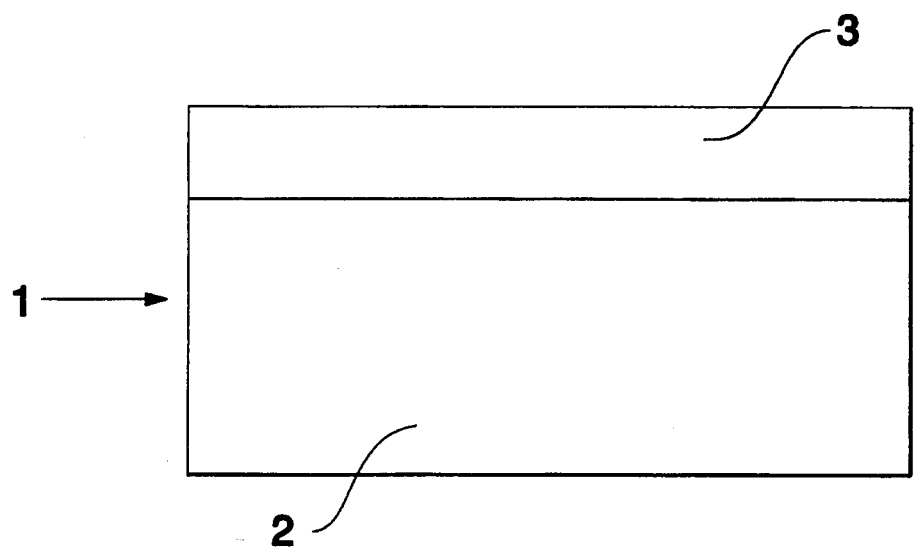
FIG. 1 shows a schematic partial diagram an article made in accordance with the present invention.

The schematic diagram of FIG. 1 represents a lens that comprises:

a layered section 2 which is in effect the main body section of the spectacle lens;

and a layered section 3 which is loaded with an active photochromic material and is of uniform thickness.

The particular moulding/casting operation of FIGS. 2–6 is in fact a process intended for use with thermoset resins for example CR39 which may be thermally or UV cured.

The basic mould for use with this type of operation comprises two glass disc like mould components 101a, 101b which are mounted in an elastomeric collar member 102 so as to define a mould cavity 103. The two glass disc like mould components comprise a front disc like mould component 101a which imparts to the cast product the front surface characteristics and a back disc like mould component 101b which imparts to the cast product the back surface characteristics.

The disc like mould components 101 are held in position in the collar member 102 by retaining portions 104.

The collar member 102 is also provided with an injector port 105 so as to enable the mould cavity to be charged with monomer material.

Figure 2:
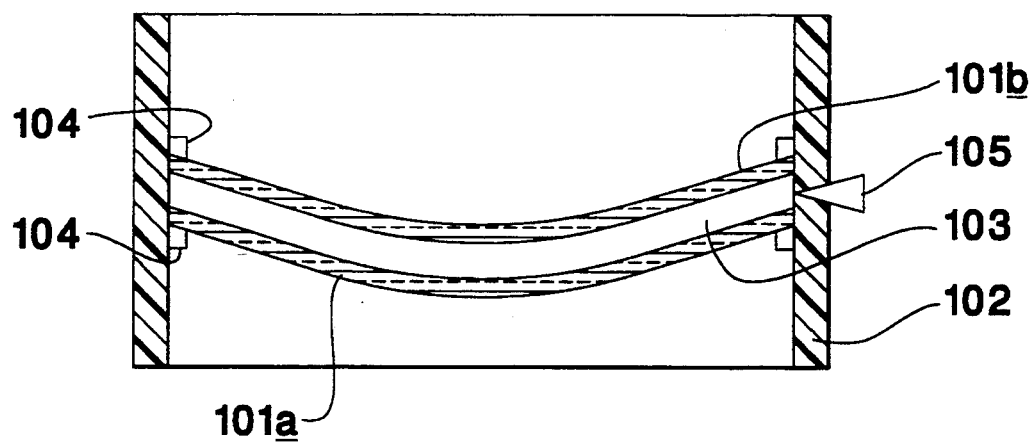
FIGS. 2–6 schematically show a method of moulding in accordance with the present invention.
Figure 3:
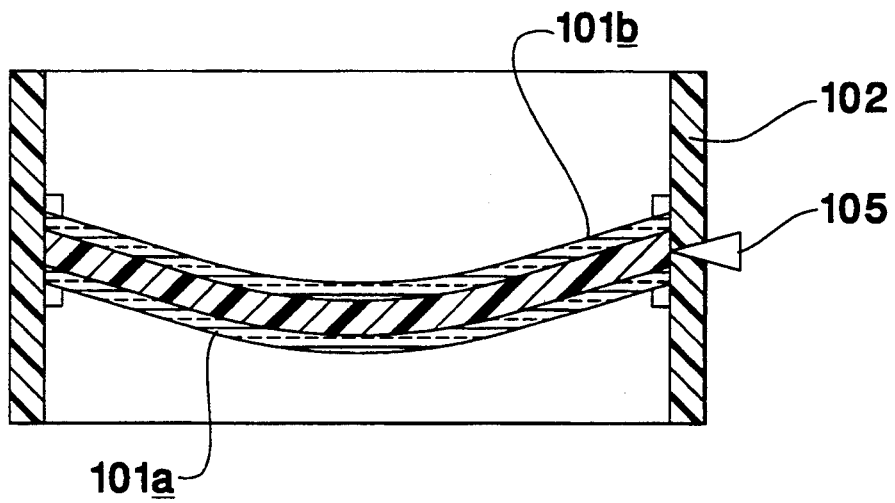
Figure 4:
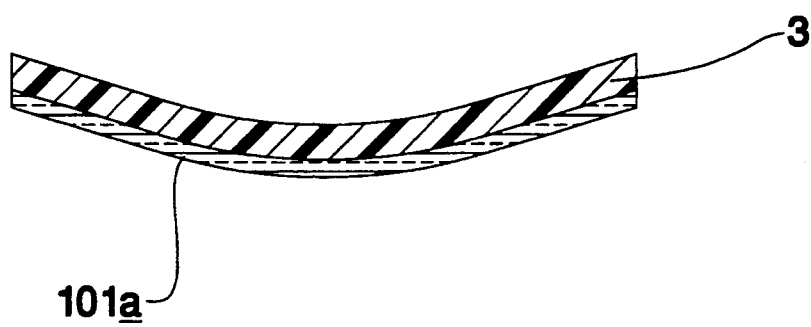
Figure 5:
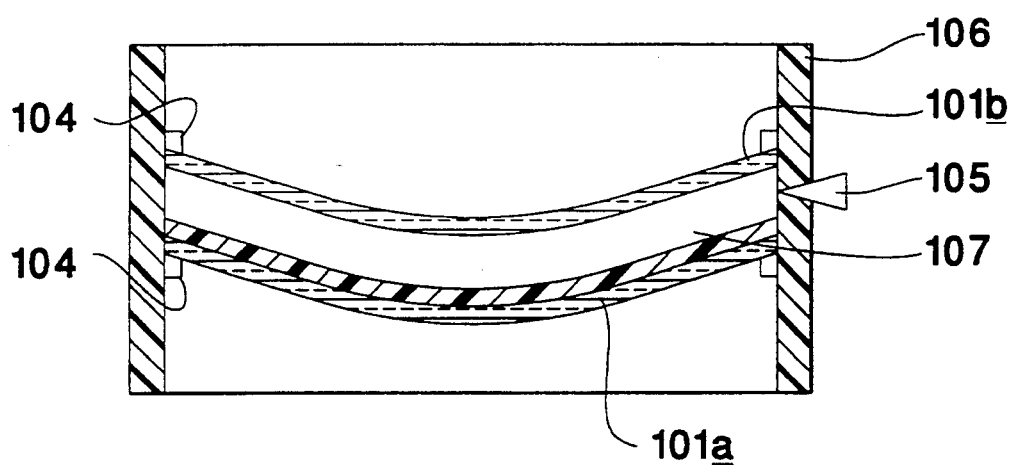
Figure 6:
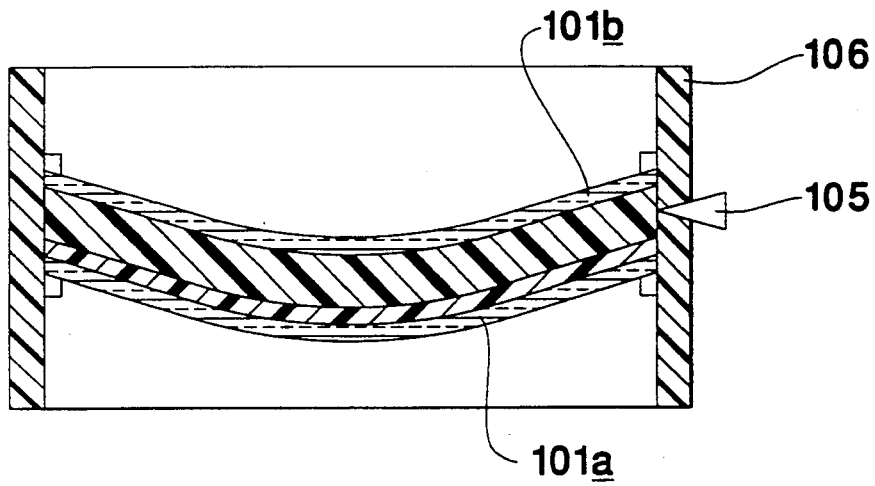

In this particular moulding/casting operation as used in the formation of a lens in accordance with FIG. 1 of the drawings, a first mould assembly is assembled as shown in FIG. 2 of the accompanying drawings. In this assembly the mould cavity 103 is shaped so that it provides a component of substantially uniform dimensions.

The mould cavity 103 is then charged with monomer material (FIG. 3) that is loaded with an active photochromic material so as to form the layer 3.

The monomer material in the mould cavity is cured until the material so formed is not fully cured but has sufficient solidity to maintain its cast shape from the mould cavity. In this particular form the cast material adheres to the glass disc like mould components.

The mould is now taken apart (FIG. 4) with the elastomeric collar member 102 being removed along with the back disc like mould component 101b. The cast material adheres to the front disc like mould component 101a.

The front disc like mould component 101a is then mounted in a second elastomeric sleeve 106 (FIG. 5) along with a new back disc like mould component 101b. In this fashion a new mould cavity 101b is defined by the back disc like mould component 101b, the second elastomeric sleeve member 106 and the cast monomer material from the original casting. This new mould cavity 107 is shaped so that the finished product will impart to the product the desired characteristics, in this case ophthalmic prescription requirement.

As in the assembly described above for the casting of the layer 3 of the lens the front and back disc like mould components are held in position within the elastomeric sleeve 106 by retaining portions.

Once the mould has been assembled the new mould cavity 107 is charged with monomeric material (FIG. 6) by means of the injector ports 105 in the second elastomeric sleeve member 106. This time the monomeric material is the same basic monomeric material or, alternatively a compatible moncemeric material used to form the layer 3 in the first casting operation. However, in this particular casting operation the monomeric material which forms the layer 2 does not contain the active material.

Figure 7:
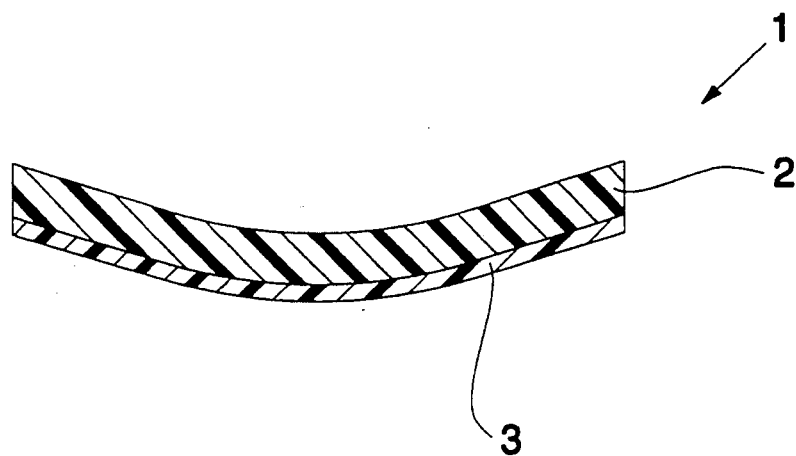
FIG. 7 schematically shows a lens of the present invention.

The monomeric materials of the first and second casting operations are now fully cured so as to form the lens 1. Once the curing has been completed the finished lens 1 can be removed. Due to the fact that the thermoset polymer has been fully cured it readily detaches from the disc like mould components and the elastomeric sleeve member, thereby readily yielding the finished product (FIG. 7).

What we claim is:

1. A method of moulding an article which is formed from two or more layered sections and has a substantially homogenous formation, which article is made from thermosetting polymeric materials, the method uses a mould having first and second changeable mould halves comprising:
   forming a mould cavity from first and second mould halves;
   loading the mould cavity by injection with a charge of a first thermosetting material;
   partially curing the first thermosetting material so that an intermediate article is formed that corresponds in shape to the mould cavity;
   changing the second mould half so as to define a subsequent mould cavity in which the partially cured first thermosetting material has a surface which is in contact with a surface of the first mould half;
   loading the subsequent mould cavity defined by the changed second mould half and the partially cured first thermosetting material with a subsequent thermosetting material which is compatible with the first thermosetting material; and
   curing the first and subsequent thermosetting materials to form a substantially homogenous layered article having no distinct phase boundary, wherein at least one of the first and subsequent thermosetting materials is loaded with an active photochromic material.

2. A method of manufacturing an article in accordance with claim 1, wherein the second mould half is changed n−1 times where n is the number of layered sections of the substantially homogenous layered article.

3. A method of manufacturing an article in accordance with claim 1, wherein the substantially homogenous layered article manufactured is a spectacle lens.

4. A method of manufacturing an article as claimed in claim 1 wherein the first and subsequent thermosetting materials are substantially identical except for the presence of the active photochromic material.

5. A method of manufacturing an article as claimed in claim 1 wherein the first thermosetting material is loaded with said active photochromic material.

6. A method of manufacturing an article as claimed in claim 1 wherein the subsequent thermosetting material is loaded with said active photochromic material.

7. A method of manufacturing an article as claimed in claim 1 wherein the other of said first and subsequent thermosetting materials is also loaded with a material selected from a group consisting of a photochromic material, an ultraviolet absorbing material, and a property modifier.

8. A method of manufacturing an article as claimed in claim 1 in which the article so formed has the said active photochromic material in a layer of uniform thickness.

9. A method of manufacturing an article as claimed in claim 7 wherein the property modifier is a hardener or a scratch resistance material.

10. A method of making a photochromic spectacle lens, comprising:
    introducing a thermosetting resin containing photochromic material into a mould cavity defined by glass disc like mould components;
    partially, but not fully, curing the resin at least until it forms a layer of sufficient solidity to maintain its cast shape in the mould cavity, which layer adheres to the glass disc like mould components;
    separating the cast, partially cured, material from one of the mould components while said layer remains adhered to the other mould component;
    introducing a thermosetting resin into a second mould cavity defined by a mould component and the thus separated, cast, partially cured material which adheres to said other mould component; the second mould cavity being shaped so that desired ophthalmic characteristics are imparted to the final product; and
    fully curing the introduced resins to yield a photochromic, ophthalmic, substantially homogenous, layered product having no distinct phase boundary.

11. The method of claim 10 wherein the photochromic material is in a layer formed of uniform thickness.

12. The method of claim 10 wherein, in addition to said layer, other layers containing materials selected from the group consisting of photochromic material, ultraviolet absorbing material, and a property modifier, are formed.

13. The method of claim 10 wherein more than one layer of adjacent, photochromic loaded, layers are formed, and the combination of layers appears to alter the colour produced on the photochromic activation.

* * * * *